United States Patent
Vaca

[11] 3,905,287
[45] Sept. 16, 1975

[54] EGG AID

[76] Inventor: Humberto Vaca, 11874 College, Detroit, Mich. 48205

[22] Filed: Sept. 11, 1973

[21] Appl. No.: 396,226

[52] U.S. Cl. .................................. 99/571; 99/580
[51] Int. Cl. ............................................. A47j 43/14
[58] Field of Search ............ 99/568, 571, 495, 580, 99/498; 30/120.1; 220/94 R, 94 A

[56] References Cited
UNITED STATES PATENTS

| | | | |
|---|---|---|---|
| 939,329 | 11/1909 | Saul | 99/580 X |
| 2,460,887 | 2/1949 | Kriz, Jr. | 99/568 X |
| 2,523,546 | 9/1950 | White | 99/580 X |
| 2,827,936 | 3/1958 | Furphy | 99/568 X |

Primary Examiner—Harvey C. Hornsby
Assistant Examiner—Alan Cantor

[57] ABSTRACT

A kitchen utensil for aiding in the frying of eggs in a skillet, the utensil consisting of a receptacle across the top of which there is a bar on which an egg can be struck in order to be cracked open, the egg shell thus cracked open having the content dripped out of the shell into the receptacle, and the receptacle having a chute to transfer the egg yolk and egg white into the heated skillet, the end of the chute then serving as a spatula to flip the fried egg or lift it from the skillet into a serving plate.

3 Claims, 3 Drawing Figures

EGG AID

This invention relates generally to kitchen implements.

It is generally well experienced by all cooks that when preparing fried eggs, there often is a messiness caused by trailing egg whites (the albumen) from the area where the egg is cracked to the skillet. Some cooks crack the egg on a nearby edge of a dish or the edge of the stove. Others crack it on the edge of the heating skillet. In either instant there can be a spilling trail of the egg white as the egg is brought over the skillet. If cracked on the skillet, some may run down the outer side and scorch in the stove burner flame, thus causing a burning odor. These egg opening methods often result in necessary cleaning up operations afterwards, so the situation is objectionable and therefore in want of an improvement.

Accordingly, it is a principle object of the present invention to provide an egg aid consisting of a vessel or receptacle having a bar across its top and on which an egg can be struck open, the egg shell thus cracked allowing the content to spill down into the vessel, thus eliminating dripping outside of the vessel on a stove or other work area.

Another object is to provide an egg aid wherein the egg white and yolk removed from the shell are then in the vessel where they can be seen prior to placement into the skillet, so to allow easy removal of any egg shell bit before being cooked.

Yet another object is to provide an egg aid in which in case the egg yolk is broken during egg shell opening, it can easily still be put aside for another use such as cake baking, instead of frying it, in case it was intended to be fried "sunny side up".

Yet another object is to provide an egg aid in which a chute integral with the vessel allows transfer of the egg to the heated skillet without breaking the yolk and without spilling, and which allows a person's hands to be not near the skillet so that they will not get burned by any splattering grease.

Yet another object is to provide an egg aid in which the chute end then serves as a spatula to either flip a fried egg or lift it from the skillet to a serving plate.

Still another object is to provide an egg aid that alternately serves as a spoon rest during cooking work.

Other objects are to provide an egg aid which is simple in design, inexpensive to manufacture, rugged in construction, easy to use, and efficient in operation.

These and other objects will be readily evident upon a study of the following specifications and the accompanying drawing, wherein.

Figure 1:
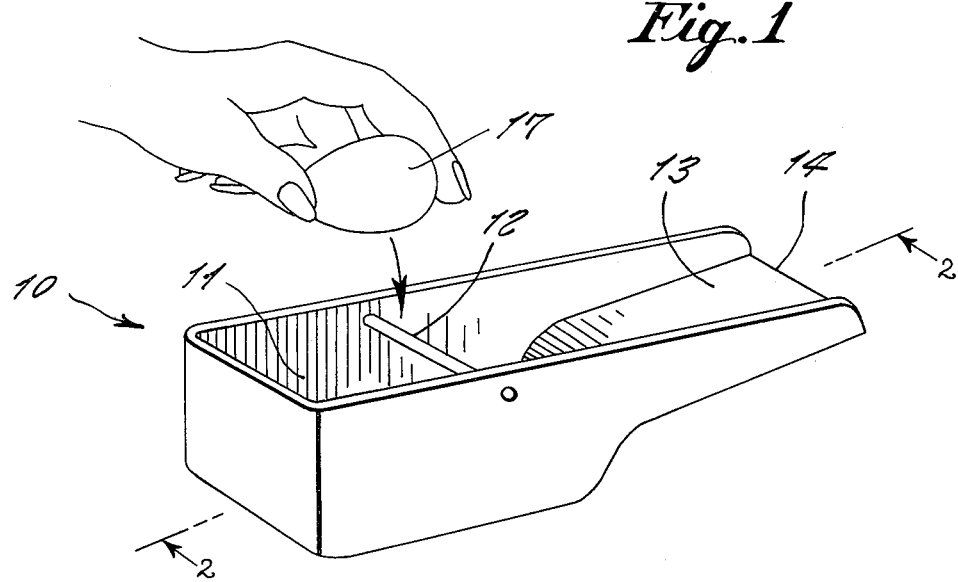
FIG. 1 is a perspective view of the present invention.

Referring now to the drawing in detail, the reference numeral 10 represents an egg aid according to the present invention made of stainless steel or any other suitable material and which includes a receptacle or vessel 11 having a bar 12 across its open top. One end of the vessel is gradually formed into a raised trough or chute 13 having a straight terminal edge 14. The vessel bottom wall 15 continues to form the bottom wall of the chute and the vessel side walls 16 that support the bar continue to form side walls of the chute.

Figure 2:
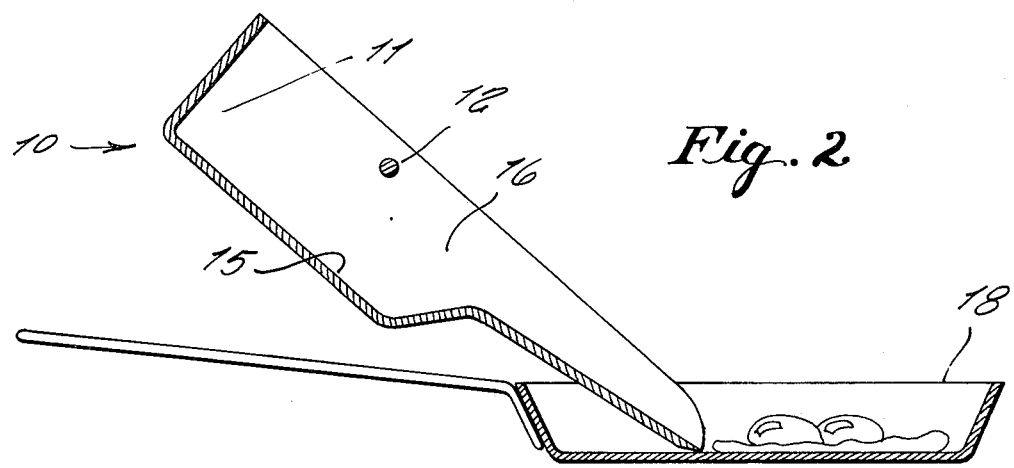
FIG. 2 is a cross-sectional view thereof taken on line 2 - 2 of FIG. 1.
Figure 3:
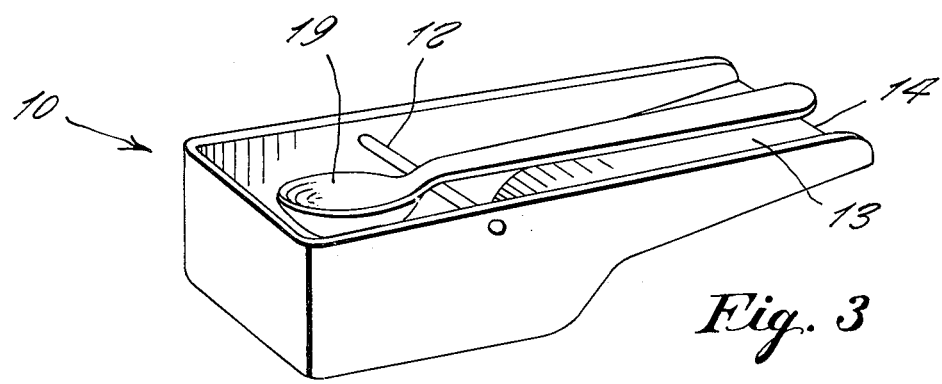
FIG. 3 is a view showing the device in use as a spoon rest.

In operative use, an egg 17 is cracked open be striking it on the bar 12, as shown in FIG. 1. The yolk and whites, removed from the egg shell, are dropped into the vessel which is then tilted, as shown in FIG. 2 so to slide them down the chute into a frying skillet 18. During frying operation the chute serves as a spatula as also shown in FIG. 2. When not used during egg frying, the egg aid 10 serves as a holder for a mixing spoon 19 during cooking work, as shown in FIG. 3.

I claim:

1. A kitchen utensil for cracking eggs and transferring eggs to a cooking vessel or the like which comprises, a receptacle having a generally rectangular bottom adapted to be rested on a horizontal surface, said receptacle having an end wall and side walls arising substantially vertically from said bottom, said side walls extending in substantially parallel planes and being substantially perpendicular to the plane of said end wall, said bottom having one portion spaced from said end wall and which extends upwardly along a slope in a direction away from said end wall, said bottom having another portion which adjoins said one portion and which extends upwardly and away from said end wall along a slope which is less than that of said one portion, said side walls having portions which adjoin said bottom portions and extend upwardly therefrom, said bottom portions and side wall portions cooperating to define a chute having an open end for slidable delivery of eggs from said receptacle responsive to tilting said receptacle, said bottom having a substantially uniform width through its extent from said end wall to said open end of said chute, and a bar fastened to said side walls above said bottom and between said end wall and said one portion of said bottom, said bar providing a surface upon which to crack an egg struck thereagainst.

2. The structure defined in claim 1 wherein said other bottom portion has a length greater than that of said one bottom portion.

3. The structure defined in claim 1 wherein said bar is substantially parallel to said end wall.

* * * * *